(12) United States Patent
Le Comte

(10) Patent No.: US 10,746,636 B2
(45) Date of Patent: Aug. 18, 2020

(54) DEVICE FOR PREPARING A LAYER OF BIOLOGICAL CELLS ON A SLIDE AND APPARATUS FOR AUTOMATICALLY PREPARING A LAYER OF CELLS USING SAID DEVICE

(71) Applicant: R.A.L. DIAGNOSTICS, Martillac (FR)

(72) Inventor: Roger Lucien Marie Le Comte, Perols (FR)

(73) Assignee: R.A.L. DIAGNOSTICS, Martillac (FR)

( * ) Notice: Subject to any disclaimer, the term of this patent is extended or adjusted under 35 U.S.C. 154(b) by 216 days.

(21) Appl. No.: 15/559,145

(22) PCT Filed: Mar. 18, 2016

(86) PCT No.: PCT/FR2016/050604
§ 371 (c)(1),
(2) Date: Sep. 18, 2017

(87) PCT Pub. No.: WO2016/146957
PCT Pub. Date: Sep. 22, 2016

(65) Prior Publication Data
US 2018/0067020 A1 Mar. 8, 2018

(30) Foreign Application Priority Data
Mar. 18, 2015 (FR) ...................................... 15 52214

(51) Int. Cl.
*G01N 1/00* (2006.01)
*G01N 1/28* (2006.01)
(Continued)

(52) U.S. Cl.
CPC .......... *G01N 1/2813* (2013.01); *B01L 3/0272* (2013.01); *B01L 3/5088* (2013.01);
(Continued)

(58) Field of Classification Search
CPC ....................................................... G01N 1/00
See application file for complete search history.

(56) References Cited

U.S. PATENT DOCUMENTS 2,982,987 A 5/1961 Knapp
4,151,915 A 5/1979 Levine et al.
(Continued)

FOREIGN PATENT DOCUMENTS

WO 2010/036352 A1 4/2010

OTHER PUBLICATIONS

International Search Report, dated Jun. 2, 2016, from corresponding PCT application No. PCT/FR2016/050604.

*Primary Examiner* — Jyoti Nagpaul
(74) *Attorney, Agent, or Firm* — Young & Thompson

(57) ABSTRACT

Disclosed is a device for preparing a layer of biological cells on a deposition surface of a slide, the device including a body provided with a channel, the body including a first end forming an inlet tip intended to enter inside a container containing a biological liquid, closed by a cap and a second end forming a depositing tip intended to deposit a drop of the liquid on the deposition surface, the second end including a spreader with a blade arranged in a plane forming an angle of inclination α with the plane of the deposition surface and elastic return interposed between the blade and the second end.

18 Claims, 5 Drawing Sheets

(51) Int. Cl.
*B01L 3/02* (2006.01)
*B01L 3/00* (2006.01)
*G01N 35/00* (2006.01)
*G01N 35/10* (2006.01)
*G01N 15/00* (2006.01)

(52) U.S. Cl.
CPC ............ *B01L 3/5635* (2013.01); *G01N 1/286* (2013.01); *G01N 35/00029* (2013.01); *G01N 35/1081* (2013.01); *B01L 3/50825* (2013.01); *B01L 2300/0672* (2013.01); *B01L 2300/0822* (2013.01); *G01N 2015/0065* (2013.01)

(56) References Cited

U.S. PATENT DOCUMENTS

| | | |
|---|---|---|
| 5,163,583 A | 11/1992 | Whitworth |
| 5,344,666 A | 9/1994 | Levine |
| 5,494,828 A | 2/1996 | Leopando |
| 5,697,522 A | 12/1997 | Mayes |
| 5,714,124 A | 2/1998 | Cuenca |
| 5,801,062 A | 9/1998 | Sarstedt et al. |
| 6,939,514 B1 | 9/2005 | Mayes |
| 2013/0228596 A1 | 9/2013 | Faulkner |
| 2015/0056695 A1* | 2/2015 | Nordberg ............. G01N 1/2813 435/309.1 |

* cited by examiner

DEVICE FOR PREPARING A LAYER OF BIOLOGICAL CELLS ON A SLIDE AND APPARATUS FOR AUTOMATICALLY PREPARING A LAYER OF CELLS USING SAID DEVICE

BACKGROUND OF THE INVENTION

Field of the Invention

This invention relates to a device for preparing a layer of biological cells from a drop of biological liquid on a microscope slide. This invention also relates to an apparatus for automatically preparing a layer of biological cells using such a device.

Description of the Related Art

Within the framework of the invention, the term "biological liquid" designates any natural liquid or biological preparation containing cells, such as blood, or bone marrow, and the term "cell" signifies equally a cell in the most conventional sense, such as red blood cells, white blood cells and platelets, as well as any other cellular type present in a biological liquid.

It is well known to make a layer with a biological liquid on a slide, then to subject this liquid to microscopic examination. This technique makes it possible, for example with blood, to observe and identify the cells. The quality of the layer is important, for example for the automatic differential analyzers of blood cells, the accuracy of which can be affected if the layer is not uniform and thin. Such a layer of blood cells is known also under the name of blood smear.

Making a blood smear is often a manual operation that consists in withdrawing a bit of blood inside a tube, then depositing a drop of it, the volume of which is about 5 mm$^3$ on a first glass slide placed horizontally on a plane. Next, a second slide is placed that is inclined at about 30°, and it is made to slide until one edge enters into contact with the drop. The drop of blood spreads along the edge by capillary action. The slide is made to slide inclined to spread the blood over the surface of the first slide, so as to form a thin layer of blood cells composed of red blood cells, white blood cells and platelets. The layer of blood cells is then dried, and then colored by at least one suitable reagent to make possible a subsequent analysis of the cells under a microscope. This analysis makes it possible in particular to determine the composition of the blood sample under consideration, which is essential for the diagnosis of certain diseases.

Such blood smears will thus comprise a zone of cells placed in a monolayer, on which the microscopic examination will be focused. The more extensive the monolayer zone, the more it will be possible to examine cells and thus, the more qualitative will be the microscopic examination.

Such a manual blood-spreading preparation poses various problems, particularly in the case of blood spreading that must be absolutely controlled so as to obtain a uniform distribution of the cells on the slide, and that regardless of the amount of cells present in the blood. Thus, such an operation often requires a laboratory technician or biologist who is well-trained to be able to produce a quality smear, i.e., a homogeneous layer of cells, neither too thin nor too thick, with cells that are not superposed. Also, reproducibility is important.

Such a manual operation also presents a risk of contact with the blood for the operator.

Another problem is connected with the handling of the relatively fragile slides that are made of glass.

To simplify the steps of withdrawing the blood and of forming a drop on a slide and so as to reduce the risk of contamination of the operator by the blood, the documents U.S. Pat. Nos. 5,714,124 and 5,163,583 describe a device for withdrawing and dispensing drops of blood on a slide comprising a flow-through channel, one end of said channel being equipped with a piercing means to pierce the stopper of a tube of blood and the opposite end forming a dispensing tip for depositing the drop. The piercing operation is done manually by the operator on a tube of blood that is positioned vertically and with the stopper in the top position. The tube is then turned upside down. To deposit the drop, the operator must apply pressure on the tube. The device comprises a stop that rests on the stopper. The stopper, made of flexible material, is deformed and puts the interior of the tube of blood under pressure, forcing the blood to leave the tube to form a drop on the outlet end of the tube. The operator stops the pressure when the drop, which has become large enough, falls on the deposit surface of the slide.

Even if such a device makes it possible to facilitate the withdrawing of blood, it is difficult to control the formation of the drop of blood.

To attempt to eliminate this problem of controlling the formation of the drop of blood, the documents U.S. Pat. Nos. 5,344,666, 5,697,522 and US 2013/0228596 describe a device for withdrawing and dispensing a drop of blood on a microscope slide that comprises a dispensing body comprising a channel, one end comprising a piercing means and the opposite end comprising a dispensing tip and support surfaces. The operator introduces the piercing means into the stopper of the tube of blood and turns the assembly upside down so as to put the support surfaces into contact with the deposit surface of the slide. The operator applies a force on the tube relative to the deposit surface so as to cause a drop of blood to come out of the dispensing tip. The amount of blood dispensed is determined by the distance separating the dispensing tip and the plane delimited by the support surfaces.

The document U.S. Pat. No. 5,801,062 also describes a device for withdrawing blood comprising a channel, one end of the channel comprising a needle to withdraw the blood from a container and the opposite end comprising a dispensing tip for depositing a drop of blood on a slide and a spreading means that is used to spread the drop of blood. However, this spreading means appears in the form of a slide that is rigidly connected to a peripheral wall of the dispensing tip and that is placed perpendicular to the wall. Thus, once the drop of blood is deposited, the operator must position the device horizontally so as to be able to use the slide to spread the blood. Thus, the spreading is performed manually by the operator, and it is not possible to control the quality of the spreading, particularly the uniformity of the layer.

According to another significant drawback, in all of these prior devices, the operator must remove the dispensing device manually, which does not make it possible to limit the risk of contamination for the user. Also, the piercing means is generally made of a metal needle, which presents a considerable risk for the operator.

The document U.S. Pat. No. 4,151,915 proposes an apparatus that makes it possible to automate the spreading of the drop of blood. However, this apparatus lacks means that make it possible to withdraw blood and deposit a drop on a slide. An operator must perform his steps prior to the spreading phase performed by the apparatus.

BRIEF SUMMARY OF THE INVENTION

Also, this invention aims to eliminate the drawbacks of the prior art by proposing a device that makes it possible to deposit with accuracy a drop of liquid and to control the spreading of the drop. This invention also proposes an apparatus that makes possible an automation of all of the steps of preparation of a blood smear.

For this purpose, this invention has as its object a device for preparing a layer of biological cells on a deposit surface of a slide, said device comprising a body equipped with a channel, said body comprising a first end forming an entry tip designed to penetrate inside a container containing a biological liquid, closed by a stopper, and a second end forming a deposit tip designed to deposit a drop of said biological liquid on the deposit surface, said second end comprising support means designed to come to rest against the deposit surface and a spreading means to spread the drop of liquid to form the layer of biological cells, said device being characterized in that said spreading means comprises a blade placed in a plane forming an angle of inclination α with a plane of the deposit surface and elastic return means that are interposed between said blade and said second end.

This invention also relates to an apparatus for automatically preparing a layer of biological cells using the preparation device defined above, said apparatus being characterized in that it comprises:

a support unit designed to receive a slide comprising a deposit surface;

a preparation unit comprising means for using the preparation device to withdraw a drop of biological liquid from a container containing a biological liquid and to spread in a controlled manner said drop of biological liquid to make a thin layer of biological cells;

means for control of the presence of the drop of liquid on the deposit surface, and means for removing the dispensing device.

This invention also relates to a method using such an apparatus for automatic preparation of a layer of biological cells; said method comprises the following steps:

putting into place a slide on the support unit, said slide comprising a deposit surface oriented upward;

attaching a container containing a biological liquid to the attaching support with the stopper of the container oriented upward;

putting into place the preparation device in the opening with the entry tip directed toward the stopper;

moving said container vertically in the direction of the preparation device so as to introduce the entry tip into the container;

placing said container and said preparation device so that the deposit tip is directed toward the deposit surface of the slide;

moving said container vertically in the direction of the deposit surface of the slide so as to put the support means into contact against the deposit surface and to apply the stopper against the support surface, thus compressing the interior of the container so as to cause a drop of biological liquid to come out in the area of the deposit tip, said drop being separated from the deposit tip under the effect of surface tension and deposited on the deposit surface;

moving the slide in a horizontal direction to achieve a relative movement between the spreading means and the deposit surface so as to spread in a controlled manner the drop of biological liquid to produce a thin layer of biological cells.

According to an advantageous embodiment, the method comprises an additional step that aims to detect the presence of the drop of biological liquid by the presence control means before moving the slide to spread the drop.

Preferably, the method comprises an additional step that aims to agitate the container to homogenize the biological liquid before depositing the drop on the deposit surface of the slide.

Other characteristics and advantages of the invention will emerge from the following description of particular embodiments of the invention, given by way of nonlimiting examples, with reference to the accompanying drawings, in which:

DETAILED DESCRIPTION OF THE PREFERRED EMBODIMENTS

Figure 1:
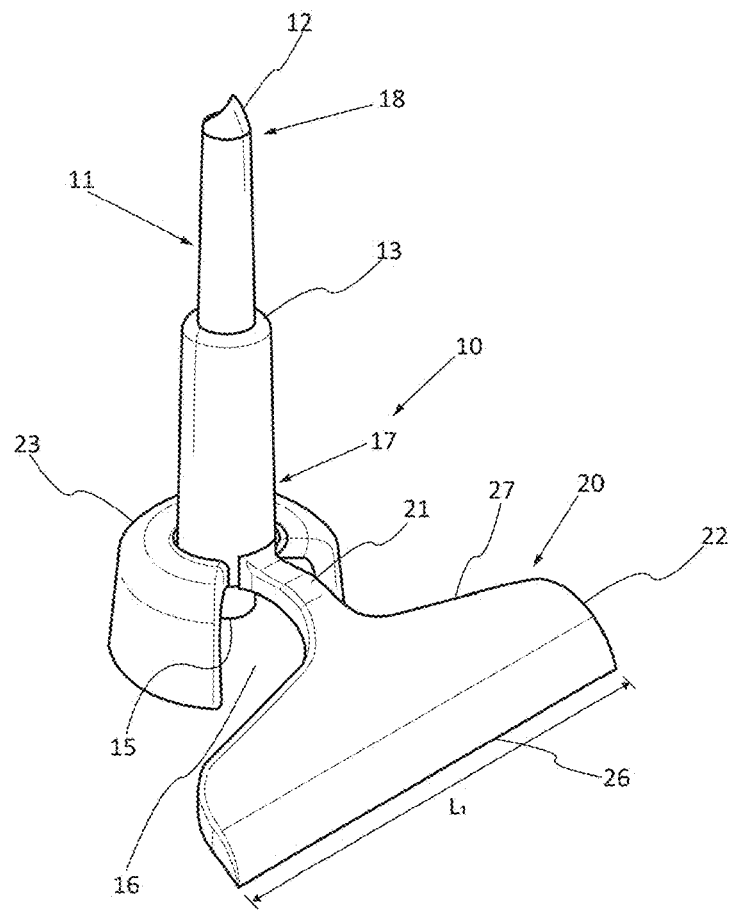
FIG. 1 is a diagrammatic view in perspective of a device for preparing a layer of biological cells according to the invention.
Figure 2A:
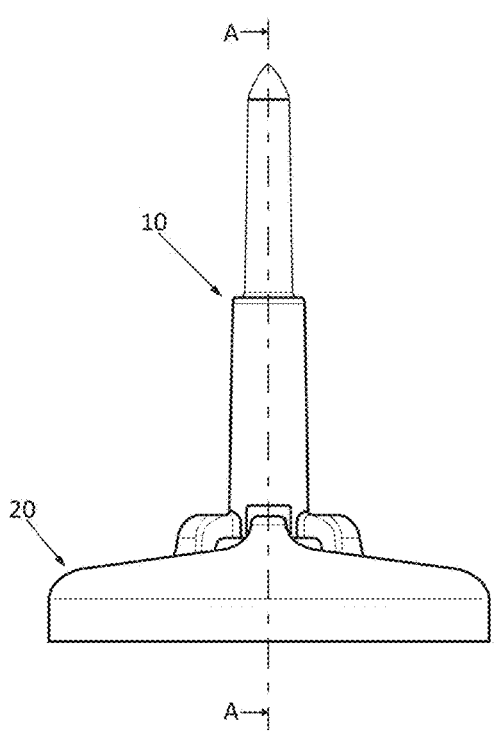
FIG. 2A is a diagrammatic profile view of the device of FIG. 1.

In FIGS. 1 and 2, a device 10 has been shown for preparing a layer of biological cells according to the invention. This device 10 is particularly suited for preparing a layer of blood cells.

Figure 3:
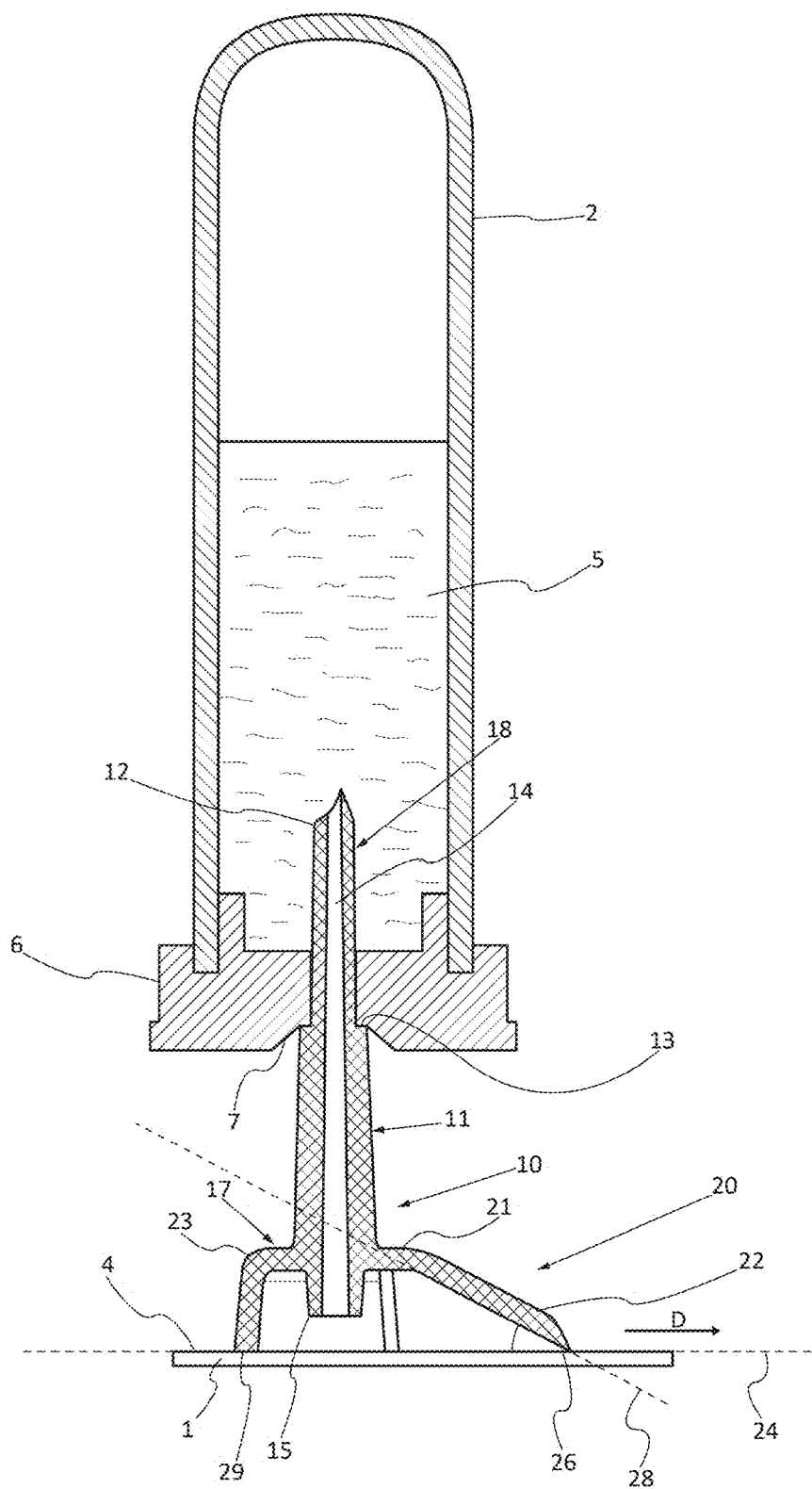
FIG. 3 is a view of the device of FIG. 2B illustrating a tube of blood that is positioned on the device during the formation of a drop of blood on the deposit surface of a slide.

In a conventional manner and as FIG. 3 illustrates it, the biological liquid 5 or the blood is contained in a container that is closed by a stopper 6. The container is generally a tube 2, and the stopper 6 is made of flexible material of the elastomer type. For the following biological liquid 5 is blood 5.

The device 10 comprises a body 11 that extends in a vertical direction.

For the remainder of the description, a vertical direction is parallel to the gravitational force G, and the up-down direction corresponds to the direction of the gravitational force G.

The body 11 is equipped with a pathway formed by a channel 14 that extends between a first end 18 and a second end 17.

The first end 18 forms an entry tip 12 that is designed to penetrate inside the tube 2 of blood 5.

According to a preferred embodiment, the entry tip 12 is configured to form a piercing means. As in the example illustrated in FIGS. 1 to 3, the piercing means is formed by a beveled end that is designed to pierce the stopper 6.

According to an embodiment, the body 11 further comprises a support surface 13 that is designed to come to rest against a zone 7 of the stopper 6 of the container so as to compress the interior of the container when, once the entry tip 12 is introduced through the stopper, a pressure is exerted on said stopper 6. This support surface 13 makes it possible to define the length of the body 11 that penetrates into the tube 2 and forms a stop.

According to an embodiment, this support surface 13 is formed by an annular shoulder 13 formed on the outer wall of the body 11.

The second end 17 forms a deposit tip 15 that is designed to deposit a drop 3 of blood 5 on the deposit surface 4 of a microscope slide that is generally made of glass.

Figure 2B:
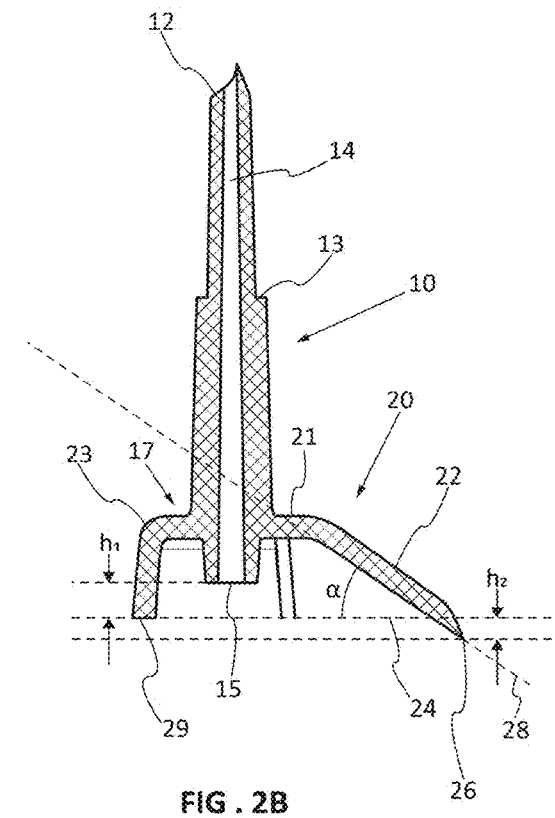
FIG. 2B is a cutaway of FIG. 2A along an axis AA.

According to an important characteristic of the invention illustrated in FIG. 2B and FIG. 3, the second end 17 further comprises a spreading means 20 to spread the drop of liquid 3 to form the layer of biological cells. This spreading means 20 comprises a spreading blade 22 located in a plane 28 that forms an angle of inclination α with a plane 24 of the deposit surface 4 and elastic return means 21 interposed between the spreading blade 22 and the second end 17.

For the remainder of the description, the spreading blade 22 will be designated by the term "blade."

According to a particularly advantageous embodiment of the invention, said spreading means 20 comprises a blade 22 having an approximately rectangular shape. This blade comprises an upper first edge 27, connected to the second end 17 by the elastic return means 21, and a lower second edge 26 that is designed to come into contact with the deposit surface 4.

Preferably, the width of the blade 22 $L_1$ corresponds to the dimension of the blood smear and is less than the dimension of the slide 1.

Preferably, the shape of the lower second edge 26 is configured to be adapted to the profile of the deposit surface 4 of the slide 1.

Further, the elastic return means 21 make it possible to adjust the angle of inclination α to make possible the adjustment of the thickness of the spreading. Preferably, this angle of inclination is between 25° and 35°.

Preferably, the elastic return means 21 appear in the form of a connecting zone made from an elastic material.

According to an embodiment illustrated in FIG. 2B, the device of the invention further comprises support means 23 designed to come to rest against the deposit surface 4 when the device 10 is placed in contact with the deposit surface 4 of the slide so as to separate the deposit tip 15 by a distance $h_1$ defined relative to the deposit surface 4. Thus, the deposit tip 15 is separated from a plane 24 delimited by the lower edges 29 of the support means by a distance $h_1$. This distance makes it possible to determine the amount of biological liquid to deposit on the deposit surface 4. When the device 10 is placed in contact with the deposit surface 4 to deposit the drop 3, the plane 24 delimited by the support means 23 is merged with the plane formed by the deposit surface 4.

According to an embodiment, the support means 23 appear in the form of a skirt partially surrounding the entry tip 15, leaving a window 16.

According to an embodiment, the support means 23 and the spreading means 20 are arranged relative to the deposit tip 15 so as to avoid any contact with the drop 3 of blood 5 when it is deposited by the dispensing tip 15. The diameter of the skirt must therefore be sufficient as a function of the nature of the liquid.

In fact, the lower second edge 26 of the blade 22 goes beyond below the plane 24 delimited by these support means 23 by a distance $h_2$ as FIG. 2B illustrates, the distance $h_2$ and the elastic return means 21 working together so as to guarantee a controlled spreading of the drop of biological liquid to form the thin layer of biological cells, as explained below.

The manual operation of the device 10 is as follows and is illustrated in FIG. 3 and FIGS. 4A to 4C.

The device 10 is introduced through the stopper 6 by its entry tip 12 until the support surface 13 comes into contact with said stopper 6. According to a preferred embodiment of the invention, a hollow cavity 7 is made in the center of the stopper, the support surface 13 being received in this cavity. The entry tip 12 is located in the tube 2.

The tube equipped with the device according to this invention is turned upside down; the support means 23 come into contact with the deposit surface 4. The tube 2 of blood 5 is oriented vertically with the stopper 6 oriented downward.

The length of the body of the device that can penetrate into the tube is limited by the support surface 13 that comes to rest against the bottom of the cavity 7.

So as to cause a drop of liquid to come out in the area of the deposit tip 15, a vertical force must be applied to the tube 2, a force that is transmitted against the deposit surface 4 by means of the lower edges 29 of the skirt 23 so that the support surface 13 comes to rest against the stopper 6, deforms it and pressurizes the interior of the tube 2. Since the blood 5 is under pressure in said tube 2, a drop 3 of blood 5 is then formed in the area of the deposit tip 15; while growing, it touches the deposit surface 4, causing—by the forces of capillary action—a separation of the drop 3 from its deposit tip 15 that has produced it.

Figure 4A:
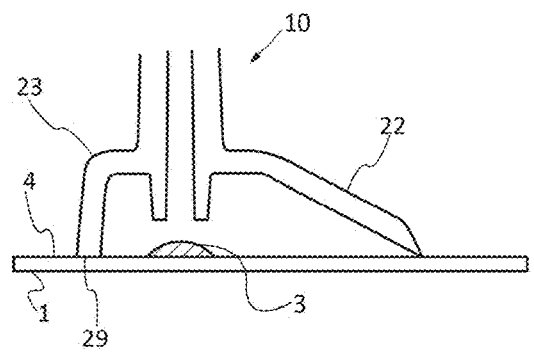
FIGS. 4A-4C are views showing the deposit tip of the device of FIG. 3 at different steps of the preparation of a blood smear.
Figure 4B:
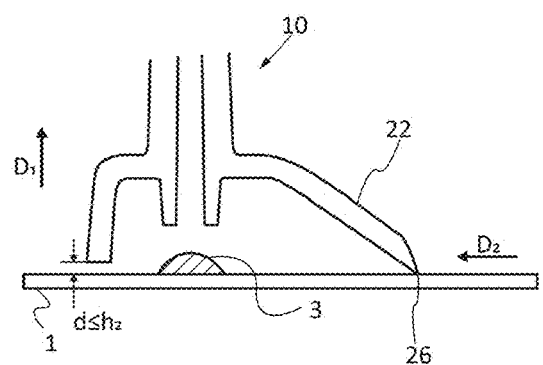
Figure 4C:
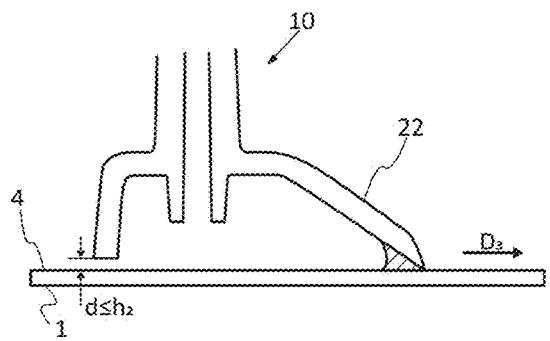

The force applied to the tube is then released, and no other drop is produced. As FIG. 4A illustrates, the lower edges 29 of the skirt of the support means 23 remain in contact with the deposit surface 4. Likewise, the blade 22 also rests on the deposit surface 4.

To make a thin layer of blood cells or a blood smear, the device 10 is raised, along an axis parallel to the gravitational force G, so that the lower edges 29 of the skirt 23 separate from the deposit surface 4 by a distance approximately less than $h_2$. The movement is represented by the arrow $D_1$ in FIG. 4B. Likewise, the blade 22 remains always slightly resting on the deposit surface 4. The lower second edge 26 is therefore slightly pressed on said deposit surface 4 with a constant and reproducible given pressure connected with the characteristics of the elastic return means 21 whose degree of elasticity is not limited to the height $h_2$. Next, a movement of the device 10 is performed relative to the slide 1 in the direction of the drop 3. The movement is represented by the arrow $D_2$ in FIG. 4B. The second edge 26 of the spreading means 20 comes into contact with the drop 3 that is immediately spread along the second edge 26 by capillary action. The drop is kept by capillary action between the second edge 26 and the deposit surface 4 of the slide 1. Finally, the device 10 whose direction of movement is indicated by the arrow $D_3$ is moved so that the blade 22 pulls on the drop. A spreading of the drop is then performed over the width of the second edge 26, along the slide 1. During the different steps, the force is adapted to keep only the contact of the blade on the deposit surface 4 without producing a second drop.

The thickness and the length of the spreading are then defined by the pressure exerted by the elastic return means 21, which is constant since the blade is resting sliding on the deposit surface 4.

This spreading thickness diminishes in proportion as the blood held by capillary action between the second edge 26 and the deposit surface 4 during movement is used. Thus, at the end of smearing, a thin layer of cells is obtained that is conducive to microscopic observation.

Figure 5A:
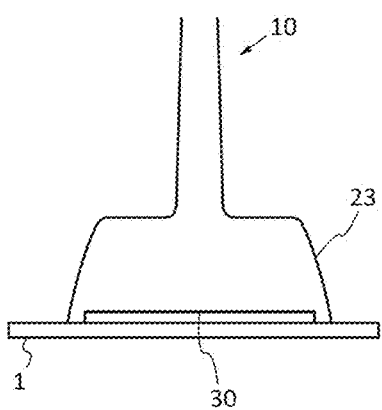
FIG. 5A is a diagrammatic profile view of a variant of the device of FIG. 3.
Figure 5B:
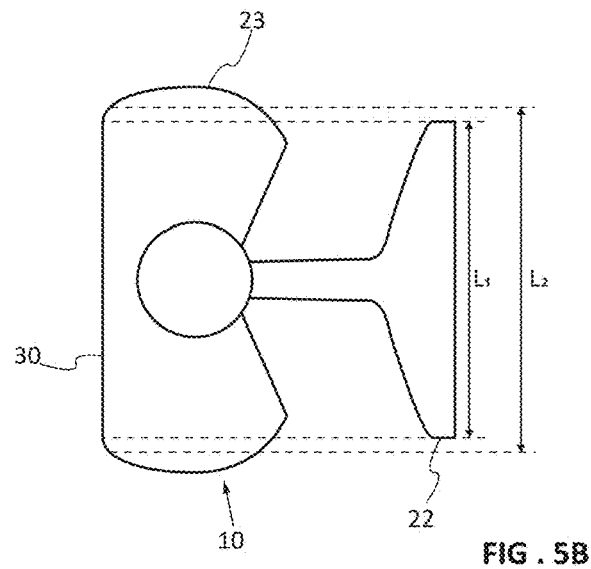
FIG. 5B is a top view of FIG. 5A.

According to a new embodiment of the device 10 illustrated in FIGS. 5A and 5B, the lower edge 29 of the support means 23 comprises an opening 30 positioned opposite the blade 22. The width $L_2$ of the opening is appreciably greater than the width $L_1$ of the lower edge 26 of the blade 22. In this way, it is no longer necessary to lift the device 10 so as to form a space between the lower edges 29 of the support means 23 and the deposit surface 4 for the purpose of moving the blade to pull on the drop; the opening 30 forms a bridge above the blood smear.

According to an embodiment, the device 10 can be made of a molded material, which makes it possible to reduce the manufacturing cost of the device.

In FIGS. 6A to 6H, an apparatus for automatic preparation 100 of a layer of biological cells according to the invention has been shown, using the device 10 that has just been described.

This apparatus comprises a structure 101 comprising a unit for preparing a layer of biological cells 110 and a slide support unit 102. The preparation unit 110 is equipped with means to automate the operation of the preparation device 10 that is described above with reference to FIG. 3 and to FIGS. 4A-4C. This structure comprises a frame of reference X, Y, Z, the axis Z being oriented in the vertical direction, the plane X, Y corresponding to a horizontal plane.

For the remainder of the description of the apparatus, the apparatus is described within the framework of a preparation of a layer of blood cells, also called a blood smear.

The blade support unit 102 comprises a horizontal support 103 designed to receive a slide 1. This slide is made of approximately rectangular glass and comprises a deposit surface 4 on which the blood smear is prepared.

The apparatus comprises means for moving in translation to move the horizontal support 103 in a horizontal direction Y between a position in which the support is entirely accessible for the operator for placing or removing the slide on the support and a position in which the slide is positioned in the preparation unit 110 that is provided to form a drop of blood on the slide 1 and to spread the drop of blood to form a blood smear in a controlled manner.

The term "controlled" designates, on the one hand, the controlled volume of the drop of blood, and, on the other hand, the controlled thickness of the blood smear.

The depositing of the drop of blood takes place at a defined location on the slide, the support being immobilized in translation. The movement of the support takes place by means of suitable movement in translation means.

Figure 6A:
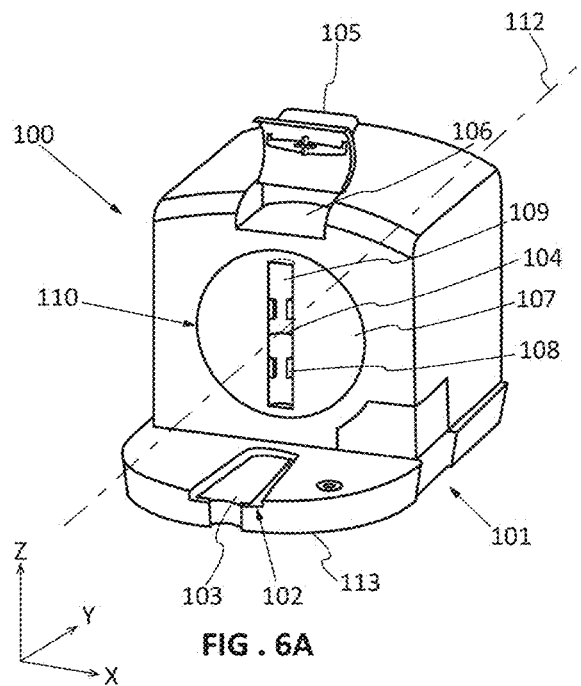
FIGS. 6A-6H are diagrammatic views in perspective of an apparatus for automatic preparation using the preparation device of the preceding figures at different steps of the preparation of a blood smear.
Figure 6B:
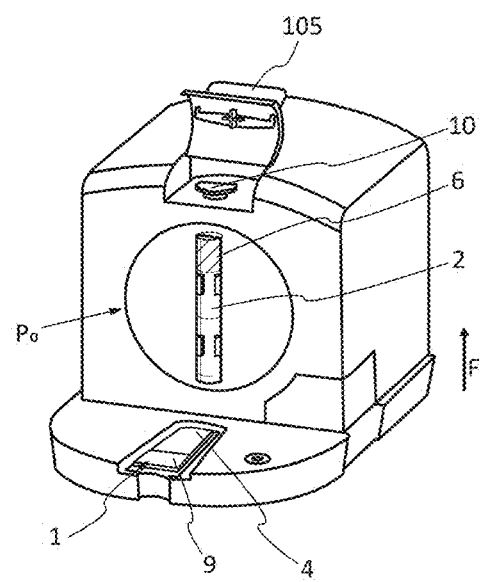

As can be seen in FIG. 6B, the slide 1 comprises a gripping zone 9 of the slide for the operator and a reserved zone comprising a deposit surface 4 for the blood smear. When the slide is placed in the preparation unit 110, only the gripping zone 9 for the operator can be seen, and the defined location of the drop of blood is situated near the reserved zone.

The preparation unit 110 comprises a plate 107 mounted to rotate around an axis 112 that extends parallel to the axis Y and an attachment support 104 that is designed to receive the tube of blood 2. The attachment support 104 is arranged diametrically relative to the plate 107. The attachment support 104 is, on the one hand, movable in a vertical direction Z and, on the other hand, carried by the rotating plate 107.

The apparatus comprises a drive means that is suitable to drive in rotation—in one direction or the other—the plate 107 sequentially, in various positions. Thus, the plate can be positioned at different angular positions.

The attachment support 104 of the tube of blood has a tubular shape and is equipped with a lateral opening 109 that extends in the direction Z. The two edges opposite the lateral opening are equipped with attachment lugs 108 that are made from a deformable elastic material. The dimension of this axial opening is less than the dimension of the tube 2. To put the tube into place on the attachment support, the tube is inserted by clipping via the axial opening and is held in position in the support.

When the plate is in a position known as the initial position or rest position that corresponds to the position illustrated in FIG. 6A, the attachment support 104 is directed vertically along the axis Z. When the tube of blood is attached on the attachment support 104 by clipping as FIG. 6B illustrates, the tube 2 of blood 5 is arranged with the stopper 6 oriented upward and the bottom of the tube oriented downward. The attaching of the tube 2 on the attachment support 104 is done manually. There is no risk there for the operator.

The structure 101 comprises an opening 106 made on a front surface of the structure 101 and is configured to receive the device for preparing a designated blood smear in its entirety by the reference 10 and illustrated in FIG. 1.

As FIG. 6B illustrates, when the preparation device 10 is placed in the opening 106, the device is arranged vertically, with the entry tip 12 introduced into the housing and oriented toward the stopper of the tube of blood and the deposit tip 15 situated outside of the opening and oriented upward. Putting the preparation device 10 into place in the preparation unit 110 is done manually.

Preferably, the opening 106 is closed by a door 105 that also has the function of holding the preparation device 10 in the vertical position during all of the steps for preparing the blood smear.

The attachment support 104 on which the tube 2 of blood 5 is attached is movable relative to the plate along the vertical axis Z. The apparatus comprises a suitable drive means to drive the vertical movement of the support 104. The movement of the support 104 that is represented by an arrow F in FIG. 6B makes it possible to control the movement of the tube vertically in an ascending manner in the direction of the entry tip 12 of the preparation device to pierce the stopper 6. The entry tip 12 then passes through the stopper and is introduced into the tube 2.

Advantageously, the travel distance of the tube is a fixed "average" travel to correspond to different tube models.

Figure 6C:
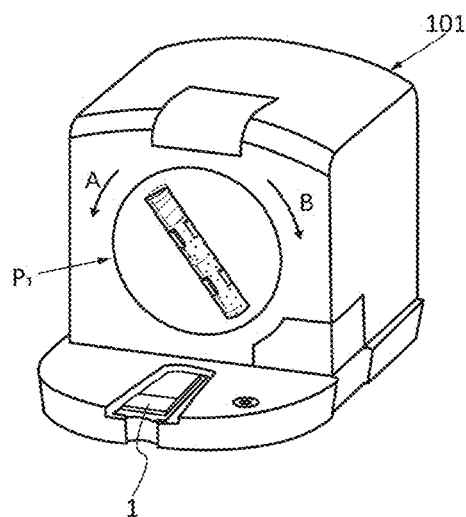
Figure 6D:
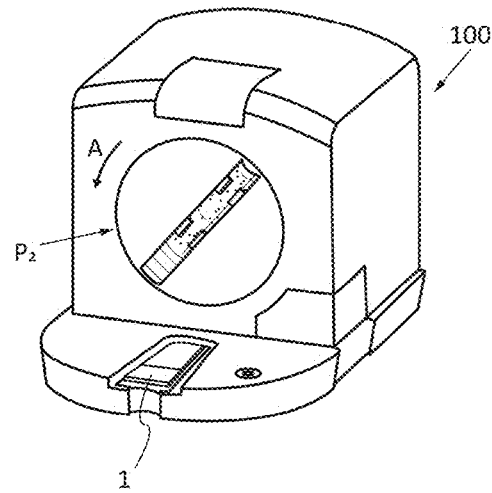

According to a particularly advantageous characteristic of the invention, the apparatus comprises agitation means that make it possible to homogenize the blood of the tube before the phase of depositing the drop of blood on the slide. These agitation means are achieved by the rotation of the plate 107 whose principle is illustrated in FIGS. 6C and 6D.

In FIG. 6B, when the preparation device is associated with the tube, the latter is in a vertical reference position P0 with the stopper 6 directed upward. To achieve the agitation, the plate performs partial rotation movements by a positive angle between a position P1 (FIG. 6C) and a position P2 (FIG. 6D). The direction of rotation of the plate is indicated by the arrow A. In the example illustrated in the figures, the range of the movement of rotation can be between 30° and 160°. The number of partial rotations between the two positions is between 10 and 20 to obtain sufficient agitation, this being given only by way of indication.

According to a variant, the movement of rotation can also take place by a negative angle B. The direction of rotation is indicated by the arrow B.

Figure 6E:
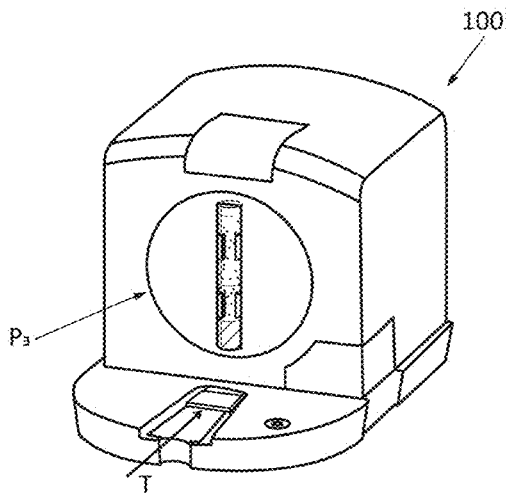

When the agitation phase is completed, the tube is turned upside down by 180°, relative to its reference position P0, into a vertical position and oriented so that the deposit tip 15 of the preparation device is oriented downward as FIG. 6E illustrates.

Next, the slide 1 placed on the slide support is translated in a direction T into the preparation unit 110 so that the deposit tip 15 of the preparation device is oriented toward the defined location on the deposit surface of the slide.

The tube 2 is moved in a descending direction so as to put the support means 23 into contact with the deposit surface 4. The tube continues its movement so as to apply the stopper 6 against the support surface 13, thus compressing the interior volume of the tube so as to cause a drop of blood to come out in the area of the deposit tip 15. The drop of blood, when it comes into contact with the deposit surface, is driven by the surface tension that is formed in the area of the deposit surface, and is separated from the deposit tip.

According to an embodiment of the invention, so as to control whether a drop is well deposited on the deposit surface of the slide, the apparatus advantageously comprises presence control means for the drop of blood deposited on the slide.

According to an embodiment that is not illustrated in the figures, these control means comprise a light emitter and a light receiver placed opposite the surface of the slide at the site of the drop of blood. The presence of the drop of blood is deduced from the optical reflection.

According to a variant, the emitter and the receiver are placed on both sides of the slide at the site of the drop of blood. In this case, the presence of the drop of blood is deduced from the optical transmission.

Thus, when the detector detects the presence of the drop on the slide, the force applied on the tube is stopped by a movement of the tube upward by means of the attachment support 104 while maintaining the contact of the support means 23 with the surface of the slide 1. The blade 22 is resting against the surface of the slide 1.

To ensure the spreading of the drop, the tube is moved upward so that the lower edges 29 of the skirt 23 separate from the surface of the slide by a distance that is roughly less than $h_2$. In this configuration, the blade 22 of the spreading means 20 rests on the surface of the slide. The spreading is achieved by a relative movement between the second edge 26 of the blade 22 and the deposit surface 4 of the slide.

In the case where the apparatus 100 uses the variant of the device illustrated in FIGS. 5A and 5B, the support means 23 remains in contact with the deposit surface 4.

Figure 6F:
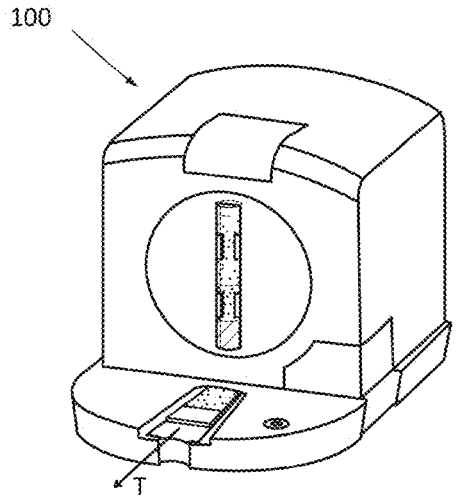

According to the invention, it is the movement of the slide, by means of the slide support, in the horizontal direction Y that causes the spreading (FIG. 6F). The blade 22 of the spreading means remains stationary and pressurized as in the case of the manual maneuvering. The movement of displacement of the slide is represented by the arrow T. A thin layer of blood cells 8 is then formed on the slide (FIG. 6G).

Figure 6G:
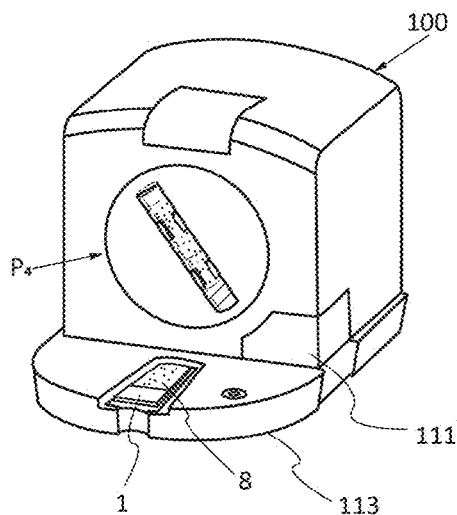
Figure 6H:
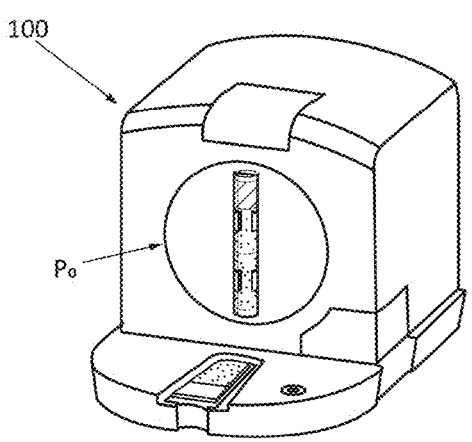

Advantageously, this movement of the slide in the direction Y makes it possible at the same time to place the slide into an exit position where it is accessible for the operator (FIG. 6G).

According to a particularly advantageous embodiment, the apparatus also comprises means for removal of the preparation device relative to the tube of blood at the end of the cycle for preparing a smear. The structure further comprises a compartment 111 for receiving the used device, located in a base 113 of the structure.

According to an embodiment as illustrated in FIG. 6G, the removal means are arranged in a position that makes an angle of about 45° relative to the axis X. When the preparation of the blood smear is completed, the second end of the device is oriented downward (FIG. 6F). To remove the preparation device 10, the plate is driven in rotation so as to place the second end in sync with the removal means. In this position and as FIG. 6G illustrates, the tube of blood makes an angle of about 45° with the axis X. The plate continues its rotation so as to place the tube that is separated from the preparation device in a vertical position (FIG. 6H), ready to be taken out of the housing.

Thus, the solution proposed by this invention makes it possible to automate all of the steps to form a layer of biological cells, thus eliminating any risk of cross-contamination from one tube to another and saving the operator from any contact with the biological liquids.

This automation makes it possible to simplify the making of blood smears.

Furthermore, the quality of the smear thus made is no longer dependent on the ability of the operator. The uniformity of the layer of cells is ensured in a controlled and reproducible manner.

The apparatus has limited bulk and requires mechanical means of a limited cost making it possible for any laboratory to be able to be equipped and therefore to improve the quality.

The means for detecting the presence of a drop of blood on the deposit surface also make possible a reliable control of the automation.

The invention claimed is:

1. A device for preparing a layer of biological cells on a deposit surface of a slide, said device comprising:
    a body equipped with a channel, said body comprising
        a first end forming an entry tip configured to penetrate inside a container containing a biological liquid, closed by a stopper, and
        a second end forming a deposit tip configured to deposit a drop of said biological liquid on the deposit surface, said second end comprising
            a support device configured to come to rest against the deposit surface, and
            a spreading system configured to spread the drop of biological liquid to form the layer of biological cells, said spreading system comprising
                a blade placed in a plane forming an angle of inclination α with a plane of the deposit surface, the blade including a lower edge configured to engage the deposit surface, the blade being configured such that the angle of inclination α of the blade causes the drop to be spread along the width of the lower edge of the blade by capillary action when an inward-facing surface of the lower edge of the blade comes into contact with the drop, and to be pulled on the deposit surface by capillary action, and
                an elastic return device interposed between said blade and said second end.

2. The device for preparing a layer of biological cells according to claim 1, wherein the blade has an approximately rectangular shape, said blade comprising
    a first edge connected to the second end by the elastic return system, and
    a second edge that goes beyond the deposit surface plane delimited by the support system by a distance h2, the second edge being the lower edge of the blade, the distance h2 and the elastic return system being configured to work together to guarantee a controlled spreading of the drop of biological liquid to form the layer of biological cells.

3. The device for preparing a layer of biological cells according to claim 2, wherein the shape of the second edge is configured to be adapted to the profile of the deposit surface.

4. The device for preparing a layer of biological cells according to claim 2, wherein said deposit tip is separated from the deposit surface plane delimited by the support system by a distance h1, defined to determine the amount of biological liquid to deposit on the deposit surface.

5. The device for preparing a layer of biological cells according to claim 2, wherein the body further comprises a support surface configured to come to rest against a zone of the stopper of the container.

6. The device for preparing a layer of biological cells according to claim 1, wherein said deposit tip is separated from the deposit surface plane delimited by the support system by a distance h1, defined to determine the amount of biological liquid to deposit on the deposit surface.

7. The device for preparing a layer of biological cells according to claim 1, wherein the body further comprises a support surface configured to come to rest against a zone of the stopper of the container.

8. The device for preparing a layer of biological cells according to claim 1, wherein the entry tip has a beveled end configured to pierce the stopper of said container.

9. The device for preparing a layer of biological cells according to claim 1, wherein said support device and the spreading system are disposed relative to the deposit tip to avoid any contact with the drop of liquid when the drop is deposited by the dispensing tip on the deposit surface.

10. The device for preparing a layer of biological cells according to claim 1, wherein said support device comprises a skirt equipped with a window.

11. An apparatus for automatic preparation of a layer of biological cells said apparatus comprising:
a support configured to receive a slide comprising the deposit surface;
a preparation unit comprising configured to use a preparation device to withdraw a drop of biological liquid from a container containing a biological liquid and to spread in a controlled manner said drop to make a thin layer of biological cells, the preparation device comprising
a body equipped with a channel, said body comprising
a first end forming an entry tip configured to penetrate inside the container containing the biological liquid, closed by a stopper, and
a second end forming a deposit tip configured to deposit the drop of said biological liquid on the deposit surface, said second end comprising
a support device configured to come to rest against the deposit surface, and
a spreading system configured to spread the drop of biological liquid to form the layer of biological cells, said spreading system comprising
a blade placed in a plane forming an angle of inclination α with a plane of the deposit surface, the blade including a lower edge configured to engage the deposit surface, the blade being configured such that the angle of inclination α of the blade causes the drop to be spread along the width of the lower edge of the blade by capillary action when an inward-facing surface of the lower edge of the blade comes into contact with the drop, and to be pulled on the deposit surface by capillary action, and
an elastic return device interposed between said blade and said second end;
a controller configured to control of the presence of the drop of biological liquid on the deposit surface; and
a removal system configured to remove the deposit tip.

12. The apparatus for automatic preparation of a layer of biological cells according to claim 11, wherein the preparation unit comprises an attachment support configured to receive the container (2), said attachment support being movable in a vertical direction Z and carried by a plate mounted to rotate around an axis.

13. The apparatus for automatic preparation of a layer of biological cells according to claim 11, wherein the controller comprises an emitter and a receiver of light.

14. The apparatus for automatic preparation of a layer of biological cells according to claim 11, further comprising an opening configured to receive the preparation device.

15. The apparatus for automatic preparation of a layer of biological cells according to claim 11, further comprising a movement system configured to move in translation in a horizontal direction to move the support between a first position for placing or removing the slide and a second position in which the slide is placed in the preparation unit.

16. A method for preparing a layer of biological cells using the preparation apparatus defined according to claim 11, the method comprising:
putting into place the slide on the support, said slide comprising the deposit surface oriented upward;
attaching the container containing the biological liquid to an attachment support with the stopper of the container oriented upward;
putting into place the preparation device in an opening with the entry tip directed toward the stopper;
moving said container vertically in the direction of the preparation device to introduce the entry tip into the container;
placing said container and said preparation device so that the deposit tip is oriented toward the deposit surface of the slide;
moving said container vertically in the direction of the deposit surface of the slide to put the support device into contact against the deposit surface and to apply the stopper against the support surface, thus compressing the interior of the container to cause the drop of biological liquid to come out in the area of the deposit tip, said drop being separated from the deposit tip under the effect of surface tension and deposited on the deposit surface; and
moving the slide in a horizontal direction to achieve a relative movement between the spreading system and the deposit surface to spread in a controlled manner the drop of biological liquid to produce a thin layer of biological cells.

17. The method for preparing a layer of biological cells according to claim 16, further comprising detecting the presence of the drop of biological liquid by a presence controller before moving the slide to spread the drop.

18. The method for preparing a layer of biological cells according to claim 16, further comprising agitating the container to homogenize the biological liquid before depositing the drop on the deposit surface of the slide.

* * * * *